(No Model.)
W. H. SWINFORD.
MILK TEMPERER FOR CHURNS.
No. 269,483. Patented Dec. 19, 1882.
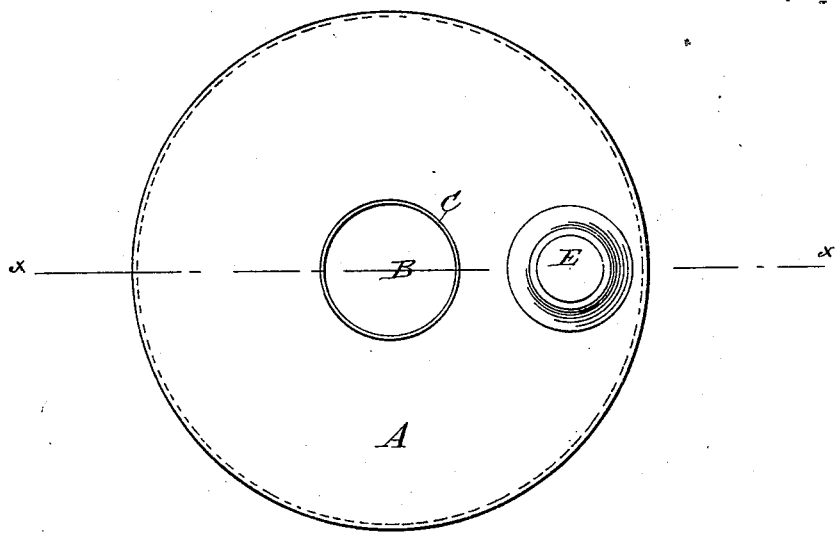
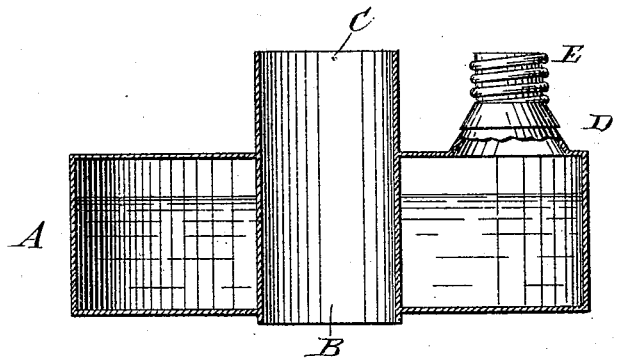
WITNESSES:
INVENTOR:
W. H. Swinford
BY Munn & Co
ATTORNEYS.

UNITED STATES PATENT OFFICE.

WILLIAM H. SWINFORD, OF CHEROKEE, ALABAMA.

MILK-TEMPERER FOR CHURNS.

SPECIFICATION forming part of Letters Patent No. 269,483, dated December 19, 1882.

Application filed June 26, 1882. (No model.)

*To all whom it may concern:*

Be it known that I, WILLIAM H. SWINFORD, of Cherokee, in the county of Colbert and State of Alabama, have invented a new and Improved Milk-Temperer for Churns, of which the following is a full, clear, and exact description.

The object of my invention is to provide a new and improved device for increasing or decreasing the temperature of milk while churning it.

The invention consists in a flat circular metallic vessel made water-tight and having a central sleeve above it, as hereinafter described and claimed.

Reference is to be had to the accompanying drawings, forming a part of this specification, in which similar letters of reference indicate corresponding parts in both the figures.

Figure 1 is a plan view of my improved milk-temperer. Fig. 2 is a cross-sectional elevation of the same on the line $x\ x$, Fig. 1.

A vessel, A, preferably made flat and cylindrical, is provided with a central vertical aperture, B, in which a sleeve, C, projecting from the top of this vessel, is fixed. This vessel is preferably made of thin sheet metal, and its joints must be made very tight, so that the vessel will be absolutely water-tight. In its top it is provided with a threaded nozzle, D, on which a threaded cap, E, can be screwed to close it.

In case the milk-temperer is to be used the dasher-rod is passed through the sleeve C, so that the vessel A rests on the dasher. If the milk is too warm for producing butter and must be cooled, the vessel A is filled with cold water or ice-chips, and if the temperature of the milk is to be raised warm or hot water is filled into the vessel. Instead of water, chemicals can be used.

The vessel A can be made of any desired size, as may be required, according to the quantity of the milk being churned.

Having thus described my invention, I claim as new and desire to secure by Letters Patent—

A milk-temperer consisting of a flat circular metallic vessel, A, made water-tight, and having the central sleeve, C, extending above it, whereby the dasher-rod may pass through it loosely and it may rest on the dasher, for the purpose specified.

WILLIAM H. SWINFORD.

Witnesses:
WYATT OATES,
WILLIAM M. WILEY.